United States Patent
Koch

[15] 3,655,962
[45] Apr. 11, 1972

[54] DIGITAL AUTOMATIC SPEED CONTROL FOR RAILWAY VEHICLES

[72] Inventor: Bradley R. Koch, Woodbridge, Va.

[73] Assignee: Melpar, Inc., Falls Church, Va.

[22] Filed: Apr. 1, 1969

[21] Appl. No.: 811,970

[52] U.S. Cl. .................246/182 C, 235/150.2, 235/150.24, 246/187 B
[51] Int. Cl. .....................B61l 3/08, G06f 15/48
[58] Field of Search ............235/150.24, 177, 150.2, 151.32; 340/23, 146.2; 246/182, 182 B, 187 B, 182 C; 180/98, 105 E, 106; 187/29 R, 29 E, 29 P, 29 V

[56] References Cited

UNITED STATES PATENTS

| | | | |
|---|---|---|---|
| 3,166,278 | 1/1965 | Steinbach et al. | 246/182 |
| 3,240,929 | 3/1966 | Hughson | 235/150.2 X |
| 3,245,728 | 4/1966 | Brooks | 235/150.2 X |
| 3,268,726 | 8/1966 | Matthews | 235/150.24 X |
| 3,268,727 | 8/1966 | Shepard | 235/150.24 X |
| 3,334,224 | 8/1967 | Allen et al. | 246/187 |
| 3,402,289 | 9/1968 | Burke et al. | 246/187 X |
| 3,519,805 | 7/1970 | Thorne-Booth | 246/182 X |

OTHER PUBLICATIONS

Toshihiko Ito, " Discontinuous Control Stops Train Accurately," Control Engineering, Jan. 1961, pp. 90–93

*Primary Examiner*—Malcolm A. Morrison
*Assistant Examiner*—Jerry Smith
*Attorney*—Hurvitz, Rose and Greene

[57] ABSTRACT

A speed control and precision stopping system for fully automatic or semi-automatic operation of railway vehicles includes a digital comparator for comparing data representative of maximum speed limit in the particular zone in which the vehicle is located with data representative of a velocity restriction imposed by a synthesized stopping profile mode. The stopping profile mode is based on the distance the vehicle must cover to reach the next scheduled stopping point, and is synthesized in the form of successive rates at which the vehicle velocity is reduced from an initial value corresponding to maximum speed limit. The lesser of the two compared speed restrictions is used as the desired vehicle speed and the actual vehicle speed is compared against this desired value to determine the sense and extent of tractive effort required to be exercised by the train controls to maintain the vehicle at desired speed. Compensation is provided for successive vehicle stopping at points short of or beyond a preset stopping target by appropriately varying the apparent speed of the train, and thereby, the tractive effort.

30 Claims, 2 Drawing Figures

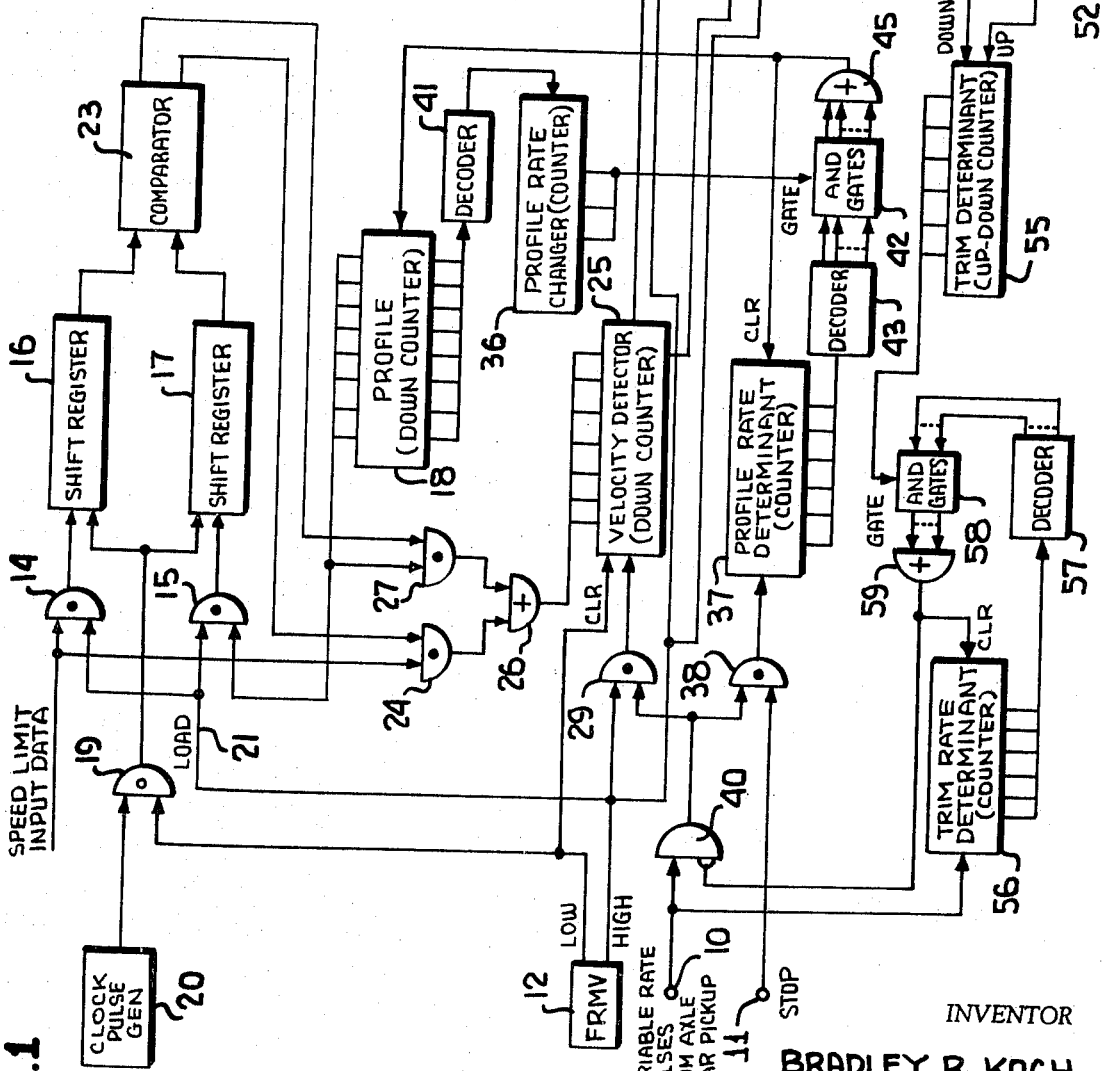

DIGITAL AUTOMATIC SPEED CONTROL FOR RAILWAY VEHICLES

BACKGROUND OF THE INVENTION

The present invention relates generally to automatic control systems for railway vehicles, and more particularly to a digital control system for governing the sense and extent of vehicle traction in accordance with digital data representative of imposed speed restrictions. The invention has particular application to mass rail-transit systems.

Previously used or proposed control systems for automatic train operation have involved extensive use of analog devices including diode function generators for providing a speed-versus-distance curve for precision stopping, and have required analog integration, and feedback from brake system and from running gear pickups. While some of these analog control systems have had limited success, they are generally characterized by inaccuracies resulting from sensitivity to such factors as temperature variations and from inherent drift, and more importantly, by a tendency toward overcontrol of the vehicle, with resulting oscillation of the vehicle and discomfort of passengers. This tendency of overcontrol is in some measure caused by the slow response time of the vehicle and its mechanical controls, versus the relatively rapid control variations exercised by a closed loop analog system.

It is an object of the present invention to provide a digital system for controlling the speed of a railway vehicle by appropriate control of vehicle traction, and which has several advantages over analog systems, particularly in economy, compactness, lower power dissipation, decisions and commands exercised in time intervals or steps preselected to correspond to reaction time of the vehicle, with consequent absence of overcontrol, and relative insensitivity to environmental conditions other than imposed speed conditions.

SUMMARY OF THE INVENTION

Briefly, the present invention comprises a digital system for controlling the movement of a railway vehicle along a track by controlling the sense or direction and the extent, in steps, of the tractive effort of the railway vehicle. That tractive effort may be in the form of propulsion, or of braking, or of coasting, depending upon the degree of movement required. The digital system includes means digitally synthesizing successive linear rates of reduction of velocity of the vehicle, beginning with the normal maximum speed limit for the zone in which the vehicle is located, as a function of distance from a selected point of approach to a scheduled stop, to establish a stopping profile operational mode at the attainment of that point. Means are provided for storing data representative of present maximum speed limit in the zone through which the vehicle is passing, and for storing data representative of a vehicle speed consistent with the present state of the stopping profile mode, and for comparing these two stored speed restrictions to select the lower-valued one as the desired speed of the vehicle. The actual vehicle speed, in digital format, is compared with the selected value of desired speed, and traction control is instituted as required to bring the actual speed to the desired speed. At predetermined intervals governed by a free running multivibrator or other clock source, the two speed restrictions are again compared to determine which has the lower value and to use that value as desired speed.

Further means are provided to store data representative of inaccuracy of stopping position in the same direction at several successive scheduled stops, and in that event, to initiate corrective measures by appropriately changing the digital format representative of actual speed to produce an indication of apparent speed which differs from actual speed. The apparent speed value then determines the tractive effort required, and is appropriate to produce that tractive effort which will tend to reduce the inaccuracy of stopping position.

BRIEF DESCRIPTION OF THE DRAWINGS

FIG. 1 is a block diagram of a system according to the invention; and

FIG. 2 is a graph illustrating the synthesis or approximation of a constant deceleration curve involving car velocity as a function of distance, to provide a stopping profile mode for the system of FIG. 1.

DESCRIPTION OF THE PREFERRED EMBODIMENT

Referring now to the drawing, one input terminal 10 of the system is connected to receive pulses from an axle gear of the train at a pulse rate directly proportional to the velocity of the train. For this purpose, a permanent magnet may be fastened near the periphery of one wheel, and a coil arranged relative to the wheel adjacent one point of the path followed by the magnet as the wheel rotates during movement of the train, to induce a pulse in the coil with each passage of the magnet. Accordingly, the faster the train moves, the greater the rate of pulses applied to terminal 10.

A second system input terminal 11 is arranged to receive a stop signal in the form of a continuous gating voltage at the conclusion of a time interval following the last stop that depends on the distance between stations and the distance covered by the train since leaving the last station. In other words, the stop signal information is preprogrammed for successive scheduled "stops" (i.e., stations at which the train is to stop) such that a stop signal will be applied to terminal 11 at a predetermined distance from the next station at which the train is to stop.

The system is constructed and arranged to undergo a series of equal steps of tractive effort, which may consist of braking, coasting, or propulsion between successive stops. This requires that recurrent periods of time be set aside to determine what type of tractive effort is called for and to initiate that effort, and that the train be permitted to respond to whatever effort has been initiated prior to the next successive determination period. For this purpose, the system includes a free running multivibrator (FRMV) 12 having a period chosen to be approximately twice that of the normal reaction time of the train to one step of tractive effort. During one half of the period of FRMV 12 it is in one of its two stable states, which for the sake of convenience is termed a high state, and during the other half of the period FRMV 12 is in its other stable state, referred to hereinafter as a low state.

At each train stop, as indicated by a suitable signal obtained from a wayside communication point at each station for which a stop is scheduled, the entire system is cleared (i.e., reset for entry of the information pertinent to the next zone), except for a "trim" portion which provides continuing corrections for accuracy of stop position of the train at every station as will be described in detail presently. Immediately after resetting, a "load" command signal is applied in the form of a continuous gating voltage in parallel to a respective gate input terminal of each of AND gates 14 and 15, to permit entry of maximum speed limit data and stopping profile velocity data, applied in binary form to the other respective input terminal of each of gates 14 and 15, into respective shift registers 16 and 17. The maximum speed limit of the train is subject to a number of restrictions which may be fixed, such as a requirement of speed reduction to a specified limit upon approach of a station, regardless of whether or not it is a scheduled stop for the train, to protect the lives of persons on or near the station platform; or which may be variable, being controlled by such factors as amount and delay of traffic on the track ahead of the train, track maintenance activity in the zone, accident on or near the track ahead, and so forth. For example, while the maximum speed limit in a particular zone might be 80 miles per hour (mph), if the block (i.e., length of track of defined limits in which use is governed by block signals) immediately ahead is occupied by another train, the speed limit for a train approaching that block might be lowered to 15 mph or less until the forward block were cleared, at which time the speed limit would again be the predesignated maximum for that zone. Consequently, the speed limit data may be varied at any time during the train's travel between stations according to information communicated via block signals transmitted from wayside stations in or near the affected blocks.

Similarly, the stopping profile velocity data to be entered into shift register 17 is subject to change, and will change as the train continues to approach a station after receipt of a stop signal, discussed above. Stopping mode profile is merely a selected set of gradually decreasing velocity magnitudes with distance suitable to produce smooth deceleration of the train from its velocity at the moment the stop signal occurs to a full stop at a desired target on the station platform. For the sake of simplicity and convenience, it will be assumed that constant deceleration of the train from maximum speed limit to zero velocity is chosen as the desired rate of change of velocity, and the preferred embodiment is implemented accordingly, as will be described. It happens that constant deceleration is an appropriate selection for determination of the stopping mode profile because it appears to represent the optimum compromise between passenger comfort and reduction of headway. However, other rates of deceleration may be chosen as alternatives, and may be implemented in a stopping mode profile in a manner consistent with the teachings to be presented herein, as will be apparent to those skilled in the art to which my invention pertains. In any event, a constant deceleration, if plotted in terms of velocity as a function of distance, yields a parabolic curve representing rate of change of velocity (from maximum speed limit to zero) with distance (from the point at which the stop signal is generated to the stopping target at the station). Such a curve is closely approximated in a piecewise linear manner by several straight lines of successively increasing slope (i.e., in the absolute sense), and one method of implementation of this piecewise linear approach will be described presently.

Returning now to the earlier discussion of loading of the shift registers 16 and 17 with speed limit and stopping profile data, respectively, a down (or backward) counter 18 (labeled "PROFILE" in the Figure) is initially loaded with a binary number representing maximum speed limit in the zone of interest, and it is this data which is to be entered into and temporarily stored in shift register 17. At this point, the content of each shift register is retained without change until it is shifted out simultaneously with the content of the other shift register by shift command signals applied in parallel to the shift registers from an AND gate 19. The shift signals are originally obtained from a clock pulse generator 20 which feeds its output pulses at a constant rate to one input terminal of gate 19. These output pulses are gated therethrough, however, only upon application of gating voltage to the other input terminal of AND gate 19, connected to the "low state" terminal of FRMV 12.

Since the period of FRMV 12 is selected in accordance with the time required to exercise each step of tractive effort on the train, it is essential that clock pulse generator 20 supply pulses at a rate sufficient to shift out the entire contents of both registers 16 during the interval time that FRMV 12 is in its low state (i.e., during one-half the period of FRMV 12). This serves to clear the shift registers of all data, in readiness to be loaded with the same data, or as previously discussed, a possible change in either or both of the speed limit data and the stopping profile velocity data. To effect reloading of the shift registers, in preparation for the next step of tractive effort, the load command signal on lead 21 may be obtained form the "high state" terminal of FRMV 12.

During the low state of FRMV 12 gating voltage is applied from the "low" terminal thereof to the gating command terminal of gate 19 to pass the clock pulses as shift pulses to the shift registers, and thereby to feed the data simultaneously from each shift register to a respective input terminal of a comparator 23. In the comparator, the present speed limit data (a number) is compared with the present stopping profile velocity data (also a number) to determine the smaller of the two. It is always the smaller of these two speed restrictions that defines the present desired velocity of the train, and as a result, the necessary tractive effort to achieve that velocity. If the present speed limit is less than the stopping profile velocity, as may occur, for example, where track conditions have resulted in the imposition of a speed limit below the maximum, a voltage is generated by the comparator for application as a gating voltage to an AND gate 24, thereby entering the number representative of present speed limit into a down counter 25 (labeled "VELOCITY DETECTOR" in the Figure) via AND gate 24 and OR gate 26. If, instead, the present stopping profile velocity is less than the speed limit, a gating voltage is applied by comparator 23 to AND gate 27 to enter the number representative of stopping profile velocity from counter 18, via gates 27 and 26, into counter 25.

When FRMV 12 switches to its high state, a gating voltage is applied to an AND gate 29 (as well as to gates 14 and 15 to reload the shift registers) to gate pulses from the axle gear pick up coil occurring at a rate directly proportional to actual velocity of the train, and normally passed by an inhibit gate 40, to velocity detector (down counter 25. The count in counter 25 is successively reduced by each incoming pulse until FRMV 12 returns to its low state and gating voltage is removed from AND gate 29, thereby discontinuing the application of any further pulses from the axle gear pickup coil to the counter. Return of FRMV 12 to the low state triggers a destructive readout of counter 25 and detection of the remaining count by detectors 30 and 31, to which the remaining count is fed via AND gate 32 which is also supplied with gating voltage from the flow terminal of FRMV 12. Detector 30 is adapted to sense a remaining count of from 0 to 3, indicating that the train velocity is equal to or slightly less than the desired velocity which had been registered in counter 25, and to produce a signal calling for zero traction (zero tractive effort), i.e., coasting. Detector 31 senses a remaining count of more than 3 in counter 25, indicating that the train velocity is more than slightly below the desired velocity, and produces a signal to the train controls calling for one step of positive tractive effort, i.e., of propulsion. For this purpose, each of detectors 30 and 31 may be a digital-to-analog converter of the type using an operational amplifier, for example, as described in Richards, Digital Computer Components and Circuits (Van Nostrand 1958), pp. 494-5. Detector 30 may sense a count of 3 or less even though the count exceeds 3, but this is not critical because the output signal of that detector merely calls for coasting and is overridden by an output signal (propulsion command) from detector 31. Alternatively, detector 30 may be completely eliminated and the train controls arranged to produce coasting in the absence of propulsion (positive traction) or braking (negative traction) signals. In this manner, if the remaining count is 3 or less it has no effect on the speed control of the train. It is to be understood, in any event, that the lowest magnitude of the remaining count resulting in propulsion need not be greater than 3, this value having been selected merely for the sake of illustration.

It may happen that the number of down counting pulses applied to velocity detector (down counter) 25 during a velocity sensing interval (i.e., one-half the period of FRMV 12) exceeds the count therein, in which case an overflow of pulses will occur from counter 25. These overflow pulses are permitted to pass through an AND gate 33, which is supplied with gating voltage during the time FRMV 12 is in its high state (and is thus supplying down-count pulses to counter 25), and on to an overflow detector 34. Detector 34 is adapted to respond to only the first pulse of the overflow pulses to initiate one step of tractive effort in the negative direction. To that end, overflow detector 34 may constitute a monostable multivibrator which is triggered to its quasi-stable state by the first incoming pulse and which has a delay time (i.e., interval from instant of assumption of the quasi-stable state to instant of spontaneous return to the stable state) longer than the anticipated period of the overflow pulses. In its quasi-stable state, detector 34 generates a voltage to initiate the single step of braking effort by the respective train control.

Switching of FRMV 12 back to its "low" state initiates reloading of shift registers 16 and 17 and a repetition of the events which have been described.

The piecewise linear approximation of the desired deceleration curve to provide gradual reductions in train velocity during a stopping mode profile initiated by a stop signal at input terminal 11, is implemented by circuitry including profile counter 18, a profile rate changer (counter) 36, and a profile rate determinant (counter) 37. Upon application of a stop signal (a continuous gating voltage) to input terminal 11, AND gate 38 acts to pass all of the axle gear pickup coil pulses appearing at terminal 10 and normally passed by inhibit gate 40, to counter 37. This is accomplished without disturbing the operation of that portion of the system previously described, since AND gates 29 and 38 are connected for parallel receipt of pulses from gate 40. Since the stop signal is initiated at a predetermined distance from the last station depending strictly upon the distance from the next station (i.e., scheduled "stop") at which the stopping profile mode is to be instituted, the count accumulated by counter 37 is suitable to accurately monitor the distance from the point at which the count is begun to the stopping target on the next station platform. This monitoring of distance is utilized to institute the necessary gradual change in velocity at various points (distances) along the route.

Specifically, when counter 37 accumulates a particular count that depends upon the particular segment of distance covered by the train at which a velocity change is to be initiated, it generates a single pulse. This pulse is applied to profile counter 18 to reduce the count therein by a single unit and is also applied to a reset terminal of counter 37 to clear the count registered in the latter counter. Accordingly, counter 37 is ready to and does accumulate a new count corresponding to the last count, again generates a single pulse to further reduce the count in profile counter 18, and resets itself. Under these conditions, counter 18 is counting down at a rate determined by the count in counter 37 at which the single pulse is generated. If the particular count of counter 37 that produces the pulse is changed, then the rate at which the count in profile counter 18 is reduced is also changed. Since the count in counter 18 is periodically used as one of the two speed restrictions from which is obtained desired velocity of the train during any given interval, mere changes in the count of counter 18 can produce periodic reductions in the desired velocity as registered by counter 25, as previously explained. These reductions will occur each time the stopping profile velocity is compared with the speed limit, provided the former is less than the latter, since the present count of profile counter 18 is then loaded into velocity detector (counter) 25, which is less than the earlier count by the number of down-count pulses generated by profile rate determinant 37 in the interim.

Moreover, a change in the rate at which counter 18 is being down-counted is effective to correspondingly vary the rate at which the desired velocity is being reduced. In other words, the rate at which single pulses are generated by profile rate determinant counter 37 determines the slope of a velocity-versus-distance plot for the stopping profile mode. To make the necessary changes of pulse-generating count of counter 37 and thereby to obtain what amounts to successively steeper slopes at which velocity is reduced as a function of distance, a profile rate changer 36, comprising another counter, is utilized to determine when a new rate of reduction of velocity is required. To that end, profile unit 18 may be connected to a conventional decoding circuit of the type described by Ledley in Digital Computer and Control Engineering (McGraw-Hill 1960) at pages 547 et seq. In general, such a circuit includes a plurality of gates connected and arranged in such a manner as to have $n$ independent input leads each capable of carrying either of two binary values, and $2^n$ output leads, each output corresponding to one of the $2^n$ possible elementary products of the $n$ inputs, and the outputs being mutually exclusive (i.e., only one at a time permitted to be a unit voltage, or pulse). For present purposes, however, a complete decoding circuit is not required for decoder 41 since input leads of the decoder may be connected to respective stages of counter 18 and only those outputs are required that correspond to particular combinations of bit values in counter 18 representing respective predetermined counts. These predetermined counts are simply digital values to be attained by counter 18 and at which it has been decided in advance that a new rate of reduction of velocity with distance is required to implement the selected stopping profile mode velocities. Assuming, for example, that seven different slopes are to be used to approximate the selected stopping profile, only seven specified values of count in counter 18 are significant and only seven outputs of decoding circuit 41 need be provided. The seven output leads of decoder 41 may be connected together for serial application of outputs to profile rate change counter 36 since these outputs will appear at specified counts in the downward count sequence of counter 18.

Profile rate changer 36 is implemented to supply a distinct continuous gating voltage for each count it assumes, as it increases one unit with each incoming pulse from decoder 41. Each distinct gating voltage is to be applied via a separate lead to respective AND gates in gate circuit 42. Each of these AND gates has as its remaining input a respective output of another partial decoding circuit, 43, associated with counter 37 to provide the change in the count that will produce a single pulse, as explained above. Specifically, decoder 43 has its input leads respectively connected to the several stages of counter 37 and has output leads corresponding to several different values of the counter 37 at which a single pulse is to be produced. The output leads of decoder 43 corresponding to these distinct and different values or counts of counter 37 are connected to the other input terminal of respective gates of gating circuit 42. The arrangement is such that when the rate of reduction of velocity with distance is to be increased as determined by preselected counts of counter 18, a gating voltage is applied by counter 36 to the AND gate 42 associated with the the decoder 43 output for the next lower pulse-producing count of counter 37.

The initial pulse rate of count-down pulses to profile counter 18 is based on a count equal to maximum speed limit in counter 18. This, in turn, results in application of a gating voltage from profile rate change counter 36 to a predetermined AND gate 42 to which are fed single pulses occurring with a selected maximum count in counter 37. These pulses are fed via an OR gate 45 to the down-count terminal of profile counter 18. Each pulse emanating from OR gate 45 is also fed back to a reset terminal of counter 37 to clear the latter counter to begin a new count with the incoming pulses from AND gate 38. As the count of profile counter 18 is reduced, whatever value is present therein at the time of loading of shift register 17 will be compared with the present speed limit value in shift register 16 and the lesser of the two utilized as the desired velocity to be loaded into velocity detector (down counter) 25 during the intervals determined by continuing operation of FRMV 12. It may happen, when the stopping profile mode is in effect, for example, that the velocity values compared in comparator 23 are not precisely the same values which may be gated to counter 25. In particular, the count in counter 18 may be reduced from what it was in the interim between comparison of speed restrictions and loading of counter 25, as a consequence of the down-count of the latter counter at one of the more rapid rates. This is not critical, however, because the desired velocity is undergoing continuing reduction, as it should be in the stopping profile mode, and the error, if any, is sufficiently small to be considered negligible. It is to be emphasized, in any event, that speed control of the train is always pegged to the lower of the two speed restrictions, speed limit or stopping profile velocity.

When counter 18 reaches the next lower count at which an output pulse is produced from decoder 41, profile rate changer 36 is increased in count by one unit and the gating voltage is thereupon switched to an AND gate 42 associated with the decoder output producing a single pulse upon attainment of the next lower preselected pulse-triggering count of profile rate determinant 37. Thus, the cycle is repeated as counter 18 is again down-counted, but this time at a faster rate because counter 37 need not achieve as high a count as earlier to cause production of a down-counting pulse. In this manner, the rate of reduction of velocity with distance is increased in steps until the train comes to a full stop.

If all components of the system and of the train running gear are within acceptable tolerance limits, the train should stop such that a precise point therein is alongside a specified target on the station platform. However, over a period of continued use of the train, wheel wear will become sufficiently great to introduce errors into the speed and distance determinations of the speed control system, because reduction of wheel diameter increases the rate at which pulses arrive at terminal 10 from the axle gear pickup coil. To compensate for such variations, the present control system is adapted to receive wayside signals from the area of the station or station platform indicating that the train has stopped short of the desired target or beyond it. Where wheel wear is the controlling factor the train will invariably stop short of the target, but since other factors may be present which would produce successive long stops, both short and long stop indications should be available. These may be achieved by placing two fixed wayside loops at either end of the station platform each associated with a different frequency generator. If the train is within the specified stopping limits both frequencies should be received at respective receiver points aboard the train. If such reception occurs throughout a stop interval, i.e., the period of time during which the train is stopped, no correction is initiated. However, should only one frequency be received for a brief interval at the lead receiver, and this at the incorrect frequency, a pulse is placed in an under target shift register 48 or other form of memory. Receipt of two frequencies for brief spaced intervals by the lead receiver is encoded into a single pulse for application to an over target shift register 49.

After a predetermined number of stops have occurred, the data stored in each shift register may be transferred to respective counters 50 and 51 by appropriately programming the system in advance, or by a manual load command. Upon attainment of a predetermined count by either counter a pulse is generated by an associated decoder 52 or 53, respectively. A pulse resulting from the predetermined under target count in counter 50 is fed to the up count terminal of an up-down counter 55, utilized as a trim determinant; whereas a pulse from decoder 53, indicative of attainment of a predetermined over target count, is applied to the down count terminal of counter 55.

A trim rate determinant in the form of a counter 56 is coupled to receive incoming pulses from the axle gear pickup to count each of those pulses. The maximum count should be chosen on the basis of the approximate average number of pulses occurring in one-half the period of FRMV 12. A decoder circuit 57 of the type previously discussed has input terminals connected to the various counter stages but requires only a few output terminals for producing a pulse on attainment of counts representing increments of 1 percent of the aforementioned approximate average number of pulses from the axle gear, from about 95 percent to about 100 percent. These output terminals of decoder 57 are connected to respective selected ones of AND gates 58, which receive gating voltage from up-down counter 55 according to distinct and different counts therein.

For the sake of illustration, assume that each advance in the count of counter 55, representing the predetermined number of stops short of target, is to cause inhibiting of 1 percent of the incoming axle gear pulses to velocity detector 25 during one period of down counting thereof. The reduction in number of these pulses is tantamount to reducing the apparent speed of the train by a corresponding percentage, and thus to require appropriate positive tractive effort (propulsion) to bring the apparent speed up to the permissible limit represented by the count in velocity detector counter 25.

Thus, there is a very rapid correction of the stopping distance of the train for on-target stopping. To obtain this correction, the first unit of count entered into up-down counter 55 supplies continual gating voltage to the AND gate 58 associated with the decoder output that carries a pulse on attainment of a 100 percent pulse count of counter 56. The latter pulse is thus passed by the AND gate, through OR gate 59, and on to the "inhibit" terminal of inhibit gate 40. As a consequence, 1 percent of the incoming pulses applied to terminal 10 of the system are prevented from reaching velocity detector 25. Each pulse supplied by OR gate 59 is fed to a reset terminal of counter 56 to restart the count therein.

FIG. 2 is a graph of train velocity versus distance illustrating a selected stopping profile curve, and the piecewise linear approximation of the actual curve be resort to a relatively small number of slope-indicating lines.

It will be apparent that variations of the specific circuit details I have disclosed herein may be resorted to without changing the basic functions sought to be provided.

I claim:

1. A digital system for automatically controlling the sense and extent of railway vehicle traction or braking, comprising first shift register means digitally synthesizing successive linear rates of reduction of velocity of the vehicle, from normal maximum speed limit, as a function of distance traveled, to establish a stopping profile operational mode for said vehicle, second shift register means for storing digital data representative of a maximum speed limit in the zone through which said vehicle is passing, third shift register means for storing digital data representative of a vehicle velocity consistent with the state of the stopping profile mode, comparator means responsive to said maximum speed limit representative data as stored in said second shift register means and to said data representative of a vehicle velocity as stored in said third shift register means for digital comparison thereof and for selection of the lower value of the two as the desired velocity of the vehicle, means responsive to digital data representative of wheel RPM of the vehicle for comparison against said desired velocity value and for selectably instituting vehicle traction and braking control of said vehicle to bring the actual vehicle velocity toward said desired vehicle velocity, and means for initiating periodic recomparison of the speed restriction data stored by said first shift register means with said third shift register means to determined whether a change has occurred in either restriction in time alternation with periodic reinstitution of said selective vehicle traction and braking control.

2. The invention according to claim 1, wherein the periods of said periodic recomparison is substantially equal to that of the response time of said vehicle to said selective traction and braking controls.

3. The invention according to claim 2, comprising means for generating a signal indicative of arrival of said vehicle at a point in said zone which is a predetermined distance from a next scheduled stopping point for monitoring the distance traveled by said vehicle from that point to said stopping point, means responsive to a measurement of said distance for modifying said vehicle velocity-representative data as a function of said successive linear rates of reduction of velocity and as a function of said distance.

4. The invention according to claim 3, further including means for monitoring the positioned accuracy of said vehicle at each scheduled stop, counter means for digitally accumulating data representative of the respective number of times said vehicle has stopped short of or beyond a preselected stopping point at each scheduled stop, and means responsive to accumulated stop position-representative data for changing said digital data representative of wheel RPM in such sense as to produce an apparent vehicle speed such as to cause said selective traction and braking control means to institute traction control tending to cause said vehicle to stop precisely at the preselected stopping point at future scheduled stops.

5. Apparatus for automatically controlling the movement of a car along a track, comprising first shift register means for storing a digital value representing an imposed upper limit on car speed for the portion of track along which the car is moving comparator means for periodically comparing the digital value recorded in said first shift register and representing said imposed upper speed limit with a digitally recorded value representative of the normal maximum speed limit in said portion of track, means responsive to said comparison means for selecting the lower of said digital values as a representation of the desired speed of the car, counter means for periodically storing a count proportional to the number of revolutions of a wheel of the car which occur in a pre-selected interval of time, to provide an indication of the actual speed of the car during that interval, means responsive to the storing by said counter means of a count indicating an actual car speed differing from said lower of said digital values selectively to control the braking effort or the propulsion effort in equal steps in a sense required to bring the actual speed of the car toward the desired speed, means further responsive to the count of said counter means for changing the digital value stored in said first shift register from normal maximum speed limit to successively lower values at successively greater linear rates, to gradually reduce the speed of the car at a succession of increasing rates of reduction, upon approach of the car to a scheduled stopping point, and means for alternately initiating said periodic comparison and said periodic count in successive time intervals.

6. The invention according to claim 5, wherein each of said successive time intervals corresponds to the normal response time of said car to each of said equal steps of braking effort or propulsion effort.

7. The invention according to claim 5, further including means responsive to inaccuracy of car stopping position in the same direction at plural successive scheduled stopping points for changing the count to be stored by said counter means such as to provide an indication of apparent speed of the car differing from actual speed to an extent required to modify said braking or propulsion effort so as to reduce said inaccuracy at a future stop.

8. A speed profiling system for a vehicle, comprising first register means for storing a first digital format representative of a maximum permitted speed of said vehicle, second register means for storing a second digital format representative of a synthetic stopping profile for said vehicle, means for comparing said formats to select which of said digital formats represents the lower speed, and means responsive to only the selected format for controlling the speed profile of said vehicle.

9. The system according to claim 8, wherein said last means includes means for measuring the actual speed of said vehicle and digitally storing a measure of said actual speed, and further includes means for comparing said measure against said selected format.

10. A method of enhancing the accuracy of stoppage of a vehicle at future stops, comprising the step of controlling the speed profile of said vehicle in proceeding to said future stops as a function of the inaccuracy of stoppages of said vehicle at stops immediately preceding said future stops.

11. A method of controlling the speed profile of a vehicle digitally, comprising comparing first digital data representing maximum permissible speed of said vehicle with second digital data representing speed of said vehicle as called for by a digitally synthesized profile of the speed of said vehicle, and controlling the actual speed profile of said vehicle in accordance only with the lower of the speeds represented by said first and second digital data.

12. The method according to claim 11, including generating a digital count representing actual speed of said vehicle, making a comparison of said digital count with that selected one of said first and second digital data which represents the lower of the speeds, and selectively applying traction or braking to said train according to the comparison achieved in making said comparison.

13. The method of controlling the speed profile of a train in coming to a stop, comprising comparing in successive time increments multi-digit digital formats of speed of said train with multi-digit digital formats representing desired speed of said train until said train comes to a stop.

14. The method according to claim 13, wherein said time increments are equal time increments.

15. The method of bringing a vehicle to stops at predetermined geographic locations in accordance with a predetermined velocity profile, comprising successively recording speeds of said vehicle in a first multi-digit digital format for fixed time intervals, successively recording desired speeds of said vehicle for said time intervals in a second multi-digit digital format, and selectively applying a predetermined traction or a predetermined braking effort to said vehicle following each of said intervals as a function of digital comparisons of said digital formats.

16. The method according to claim 15, wherein said desired speeds are speeds established according to said velocity profile.

17. The method according to claim 15, wherein is included the further steps of modifying at least one of said formats in such sense and extent as to modify said velocity profiles as a function of the accuracy with which said vehicle attains said stops.

18. The method of accurately bringing a vehicle to stops at predetermined geographic locations in accordance with a controlled speed profile, comprising controlling the speed profile of said vehicle in approaching one of said geographic locations so as to stop said vehicle at least approximately at said one of said geographic locations, sensing the inaccuracy with which said vehicle stops at said one of said geographic locations, and modifying said speed profile so as to compensate for said inaccuracy in stopping at a succeeding geographic location.

19. The method according to claim 18, wherein said speed profile is controlled in time spaced time increments only.

20. The method according to claim 19, wherein said speed profile includes plural discrete values of speed recorded in digital format.

21. The method according to claim 19, wherein sense inaccuracy is measured in terms of a digital format.

22. The method of accurately bringing a vehicle to a stop at fixed points in accordance with a predetermined speed profile in proceeding a predetermined constant distance to said fixed points, comprising obtaining a signal representing accuracy with which said vehicle stops at a first of said fixed points, and modifying said speed profile as a function of an information bearing characteristic of said signal so as to enhance said accuracy for succeeding ones of said points.

23. The method according to claim 22, wherein said predetermined speed profile is recorded in a digital format.

24. The method according to claim 22, wherein said signal is a digital format signal.

25. The method of accurately bringing a vehicle to a stop at fixed points, in accordance with a predetermined speed profile, in proceeding a predetermined distance to each of said fixed points, comprising obtaining a signal representing accuracy with which said vehicle stops at a first of said fixed points, and modifying said speed profile as a function of said signal so as to enhance said accuracy for a succeeding one of said points.

26. The method according to claim 25, wherein said predetermined speed profile is registered in a digital format.

27. The method according to claim 25, wherein said predetermined constant distance is measured in terms of a count of rotations of a wheel of said vehicle.

28. The method according to claim 25, wherein said signal representing accuracy is a digital count.

29. The method according to claim 25, wherein modifying said speed profile is accomplished by modifying said count of rotations of said wheel.

30. The method according to claim 25, wherein said predetermined speed profile is registered in a digital format, said predetermined constant distance is measured in terms of a count of the rotations of a wheel of said vehicle, and wherein said signal representing accuracy is a digital count.

* * * * *